US011637843B2

(12) United States Patent
Zhao et al.

(10) Patent No.: US 11,637,843 B2
(45) Date of Patent: *Apr. 25, 2023

(54) SYSTEM AND METHOD TO ESTIMATE NETWORK DISRUPTION INDEX

(71) Applicant: Cisco Technology, Inc., San Jose, CA (US)

(72) Inventors: Jiabin Zhao, Saratoga, CA (US); Gargi Adhav, San Jose, CA (US); Ammar Rayes, San Ramon, CA (US); Erin Lynne Brown, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/159,326

(22) Filed: Jan. 27, 2021

(65) Prior Publication Data

US 2021/0152577 A1 May 20, 2021

Related U.S. Application Data

(63) Continuation of application No. 16/137,112, filed on Sep. 20, 2018, now Pat. No. 10,951,635.

(51) Int. Cl.
*H04L 29/06* (2006.01)
*H04L 9/40* (2022.01)
(Continued)

(52) U.S. Cl.
CPC ...... *H04L 63/1416* (2013.01); *H04L 43/0811* (2013.01); *H04L 43/0817* (2013.01);
(Continued)

(58) Field of Classification Search
None
See application file for complete search history.

(56) References Cited

U.S. PATENT DOCUMENTS 6,157,707 A * 12/2000 Baulier ................. H04M 15/58
379/189
7,890,869 B1 ‡ 2/2011 Mayer .................... H04L 41/22
715/73
(Continued)

FOREIGN PATENT DOCUMENTS

CN 106992904 A ‡ 7/2017
CN 106992904 A 7/2017
WO 2016/180127 A1 11/2016

OTHER PUBLICATIONS

Khalil, Issa. MCC: Mitigating Colluding Collision Attacks in Wireless Sensor Networks. 2010 IEEE Global Telecommunications Conference GLOBECOM 2010. https://ieeexplore.ieee.org/stamp/stamp.jsp?tp=&arnumber=5683731 (Year: 2010).*

(Continued)

*Primary Examiner* — Jeremiah L Avery
(74) *Attorney, Agent, or Firm* — Edell, Shapiro & Finnan, LLC

(57) ABSTRACT

Presented herein are methodologies for implementing a system and apparatus to estimate a network disruption index and undertake a mitigation action accordingly. A method includes calculating a network disruption index based on at least a disruption score associated with a service request measure, an end-of-life measure, a security incident response measure and a return material authorization measure for respective hardware devices in a network, comparing the network disruption index to a predetermined threshold, and when the network disruption index is above the predetermined threshold, identifying one or more of the hardware devices in the network for a mitigation action and implementing the mitigation action.

20 Claims, 20 Drawing Sheets

(51) Int. Cl.
*H04L 43/0811* (2022.01)
*H04L 43/0817* (2022.01)
*H04L 45/28* (2022.01)

(52) U.S. Cl.
CPC .......... *H04L 45/28* (2013.01); *H04L 63/1433* (2013.01); *H04L 63/20* (2013.01)

(56) References Cited

U.S. PATENT DOCUMENTS

| | | | | |
|---|---|---|---|---|
| 8,514,704 | B2 ‡ | 8/2013 | Fraccalvieri | H04L 47/22 370/23 |
| 8,832,262 | B2 ‡ | 9/2014 | Hamilton | H04L 41/5032 709/22 |
| 9,602,370 | B2 ‡ | 3/2017 | Golani | H04L 43/08 |
| 2011/0051904 | A1* | 3/2011 | Triano | G08B 21/185 379/32.01 |
| 2012/0290716 | A1* | 11/2012 | Ogielski | H04L 45/12 709/224 |
| 2017/0116626 | A1* | 4/2017 | Ramamoorthy | H04L 41/40 |
| 2018/0350395 | A1* | 12/2018 | Simko | G10L 15/22 |
| 2019/0279118 | A1* | 9/2019 | Beynel | G06Q 10/02 |
| 2019/0327259 | A1* | 10/2019 | DeFelice | H04L 63/1408 |

OTHER PUBLICATIONS

Copeland, Rebecca; Crespi, Noel. Identifying risk profiles and mitigating actions for business communication services. 10th International Conference on Network and Service Management (CNSM) and Workshop. https://ieeexplore.ieee.org/stamp/stamp.jsp?tp=&arnumber=7014165 (Year: 2014).*

Krebs, Martin et al. Topology Stability-Based Clustering for Wireless Mesh Networks. 2010 IEEE Global Telecommunications Conference GLOBECOM 2010. https://ieeexplore.ieee.org/stamp/stamp.jsp?tp=&arnumber=5683417 (Year: 2010).*

Munir, Rashid et al. Detection, Mitigation and Quantitative Security Risk Assessment of Invisible Attacks at Enterprise Network. 2015 3rd International Conference on Future Internet of Things and Cloud. https://ieeexplore.ieee.org/stamp/stamp.jsp?tp=&arnumber=7300826 (Year: 2015).‡

He, Miao et al. Big data fueled process management of supply risks: Sensing, prediction, evaluation and mitigation. Proceedings of the Winter Simulation Conference 2014.https://ieeexplore.ieee.org/stamp/stamp.jsp?tp=&arnumber=7019960 (Year: 2014).‡

Girma, Anteneh et al. Analysis of DDoS Attacks and an Introduction of a Hybrid Statistical Model to Detect DDoS Attacks on Cloud Computing Environment. 2015 12th International Conference on Information Technology—New Generations. https://ieeexplore.ieee.org/stamp/stamp.jsp?tp=&arnumber=7113475 (Year: 2015).‡

Munir, Rashid et al., "Detection, Mitigation and Quantitative Security Risk Assessment of Invisible Attacks at Enterprise Network", 2015 3rd International Conference on Future Internet of Things and Cloud, Aug. 24-26, 2015, 8 pages.

He, Miao et al., "Big data fueled process management of supply risks: Sensing, prediction, evaluation and mitigation", Proceedings of the 2014 Winter Simulation Conference, Dec. 7-10, 2014, 9 pages.

Girma, Anteneh et al., "Analysis of DDoS Attacks and an Introduction of a Hybrid Statistical Model to Detect DDoS Attacks on Cloud Computing Environment", 2015 12th International Conference on Information Technology—New Generations, Apr. 13-15, 2015, 6 pages.

\* cited by examiner
‡ imported from a related application

MEASURE - WEIGHT MATRIX P

- WEIGHTS ARE NOT YET NORMALIZED

- ASSIGNED BY COMPARATIVE ANALYSIS OF POTENTIAL DISRUPTION IMPACT

- EOX REACHED - OPERATIONAL PERFORMANCE IS IMPAIRED BUT MOST BUSINESS OPERATIONS REMAIN FUNCTIONAL - (SR SEVERITY 3)

- EOX NEAR - INFORMATION OR ASSISTANCE REQUIRED, NO EFFECT ON BUSINESS OPERATIONS - (SR SEVERITY 4)

- SR SEVERITY LEVELS MATCH UP WITH SA IMPACT RATINGS

| | DISRUPTION IMPACT → | | | |
|---|---|---|---|---|
| MEASURES | 1 SERVICE REQUEST SEVERITY 4 | 2 SERVICE REQUEST SEVERITY 3 | 3 SERVICE REQUEST SEVERITY 2 | 4 SERVICE REQUEST SEVERITY 1 |
| | 1 SECURITY ADVISORY LOW IMPACT | 2 SECURITY ADVISORY MEDIUM IMPACT | 3 SECURITY ADVISORY HIGH IMPACT | 4 SECURITY ADVISORY CRITICAL IMPACT |
| | 1 EOX NEAR | 2 EOX REACHED | 0 | 0 |

WEIGHT → (points to "1" above SERVICE REQUEST SEVERITY 4)
MEASURE → (points to SERVICE REQUEST SEVERITY 4)
CATEGORY → (points to SECURITY ADVISORY LOW IMPACT)

FIG.2

$$\begin{bmatrix} H_{1,1} & H_{1,2} & H_{1,3} \\ H_{2,1} & H_{2,2} & H_{2,3} \\ \cdots & \cdots & \cdots \\ H_{N,1} & H_{N,2} & H_{N,3} \end{bmatrix}$$

DEVICE 1, DEVICE 2, ..., DEVICE N

Columns: HARDWARE CLASS, HARDWARE MODEL, HARDWARE FUNCTION

NETWORK DEVICE HARDWARE MATRIX

FIG.3

|  | SOFTWARE TYPE + VERSION 1 | SOFTWARE TYPE + VERSION 2 | ... | SOFTWARE TYPE + VERSION NS |
|---|---|---|---|---|
| DEVICE 1 | $S_{1,1}$ | $S_{1,2}$ | ... | $S_{1,NS}$ |
| DEVICE 2 | $S_{2,1}$ | $S_{2,2}$ | ... | $S_{2,NS}$ |
| ... | ... | ... | ... | ... |
| DEVICE N | $S_{N,1}$ | $S_{N,2}$ | ... | $S_{N,NS}$ |

NETWORK DEVICE SOFTWARE MATRIX

FIG.4

$$\begin{bmatrix} T_{1,1} & T_{1,2} \\ T_{2,1} & T_{2,2} \\ \vdots & \vdots \\ T_{NS,1} & T_{NS,2} \end{bmatrix}\begin{array}{l} \text{SOFTWARE TYPE + VERSION 1} \\ \text{SOFTWARE TYPE + VERSION 2} \\ \cdots \\ \text{SOFTWARE TYPE + VERSION NS} \end{array}$$

SOFTWARE TYPE | SOFTWARE VERSION

SOFTWARE TYPE + VERSION MATRIX

FIG.5

|  | OPERATING SYSTEM TYPE | OPERATING SYSTEM VERSION | SPECIAL FEATURES ENABLED |
|---|---|---|---|
| DEVICE 1 | $O_{1,1}$ | $O_{1,2}$ | $O_{1,3}$ |
| DEVICE 2 | $O_{2,1}$ | $O_{2,2}$ | $O_{2,3}$ |
| ••• | ••• | ••• | ••• |
| DEVICE N | $O_{N,1}$ | $O_{N,2}$ | $O_{N,3}$ |

OPERATING SYSTEM TYPE + VERSION + FEATURES MATRIX

FIG.6

| | IMPACT RATING | DATE ISSUED | DATE RESOLVED | RESOLUTION TYPE | HW AFFECTED | SW AFFECTED | OS AFFECTED |
|---|---|---|---|---|---|---|---|
| SA 1 | $A_{1,1}$ | $A_{1,2}$ | $A_{1,3}$ | $A_{1,4}$ | $A_{1,5}$ | $A_{1,6}$ | $A_{1,7}$ |
| SA 2 | $A_{2,1}$ | $A_{2,2}$ | $A_{2,3}$ | $A_{2,4}$ | $A_{2,5}$ | $A_{2,6}$ | $A_{2,7}$ |
| SA 3 | $A_{3,1}$ | $A_{3,2}$ | $A_{3,3}$ | $A_{3,4}$ | $A_{3,5}$ | $A_{3,6}$ | $A_{3,7}$ |
| ... | ... | ... | ... | ... | ... | ... | ... |
| SA NA-1 | $A_{NA-1,1}$ | $A_{NA-1,2}$ | $A_{NA-1,3}$ | $A_{NA-1,4}$ | $A_{NA-1,5}$ | $A_{NA-1,6}$ | $A_{NA-1,7}$ |
| SA NA | $A_{NA,1}$ | $A_{NA,2}$ | $A_{NA,3}$ | $A_{NA,4}$ | $A_{NA,5}$ | $A_{NA,6}$ | $A_{NA,7}$ |

NETWORK SECURITY ADVISORY MATRIX

FIG.7

| | INITIAL SEVERITY RATING | MAXIMUM SEVERITY RATING | OUTAGE | DATE OPENED | DATE CLOSED | ESCALATION STATUS | HW AFFECTED | SW AFFECTED | OS AFFECTED |
|---|---|---|---|---|---|---|---|---|---|
| SR 1 | $R_{1,1}$ | $R_{1,2}$ | $R_{1,3}$ | $R_{1,4}$ | $R_{1,5}$ | $R_{1,6}$ | $R_{1,7}$ | $R_{1,8}$ | $R_{1,9}$ |
| SR 2 | $R_{2,1}$ | $R_{2,2}$ | $R_{2,3}$ | $R_{2,4}$ | $R_{2,5}$ | $R_{2,6}$ | $R_{2,7}$ | $R_{2,8}$ | $R_{2,9}$ |
| SR 3 | $R_{3,1}$ | $R_{3,2}$ | $R_{3,3}$ | $R_{3,4}$ | $R_{3,5}$ | $R_{3,6}$ | $R_{3,7}$ | $R_{3,8}$ | $R_{3,9}$ |
| ••• | ••• | ••• | ••• | ••• | ••• | ••• | ••• | ••• | ••• |
| SR NR-1 | $R_{NR-1,1}$ | $R_{NR-1,2}$ | $R_{NR-1,3}$ | $R_{NR-1,4}$ | $R_{NR-1,5}$ | $R_{NR-1,6}$ | $R_{NR-1,7}$ | $R_{NR-1,8}$ | $R_{NR-1,9}$ |
| SR NR | $R_{NR,1}$ | $R_{NR,2}$ | $R_{NR,3}$ | $R_{NR,4}$ | $R_{NR,5}$ | $R_{NR,6}$ | $R_{NR,7}$ | $R_{NR,8}$ | $R_{NR,9}$ |

NETWORK SERVICE REQUEST MATRIX

FIG.8

| | EOX DATE | HW/OS/SW | TYPE | VERSION | DETAILS | DEVICES AFFECTED |
|---|---|---|---|---|---|---|
| EOX 1 | $X_{1,1}$ | $X_{1,2}$ | $X_{1,3}$ | $X_{1,4}$ | $X_{1,5}$ | $X_{1,6}$ |
| EOX 2 | $X_{2,1}$ | $X_{2,2}$ | $X_{2,3}$ | $X_{2,4}$ | $X_{2,5}$ | $X_{2,6}$ |
| ... | ... | ... | ... | ... | ... | ... |
| EOX NX | $X_{NX,1}$ | $X_{NX,2}$ | $X_{NX,3}$ | $X_{NX,4}$ | $X_{NX,5}$ | $X_{NX,6}$ |

END-OF-LIFE/END-OF-SERVICE LISTINGS MATRIX

FIG.9

|  | SR 1 | ... | SR NR | SA 1 | ... | SA NA | EOX 1 | ... | EOX NX |
|---|---|---|---|---|---|---|---|---|---|
| DEVICE 1 | $M_{1,1}$ | ... | $M_{1,NR}$ | $M_{1,NR+1}$ | ... | $M_{1,NR+NA}$ | $M_{1,NR+NA+1}$ | ... | $M_{1,NR+NA+NX}$ |
| DEVICE 2 | $M_{2,1}$ | ... | $M_{2,NR}$ | $M_{2,NR+1}$ | ... | $M_{2,NR+NA}$ | $M_{2,NR+NA+1}$ | ... | $M_{2,NR+NA+NX}$ |
| DEVICE 3 | $M_{3,1}$ | ... | $M_{3,NR}$ | $M_{3,NR+1}$ | ... | $M_{3,NR+NA}$ | $M_{3,NR+NA+1}$ | ... | $M_{3,NR+NA+NX}$ |
| ... | ... | ... | ... | ... | ... | ... | ... | ... | ... |
| DEVICE N-1 | $M_{N-1,1}$ | ... | $M_{N-1,NR}$ | $M_{N-1,NR+1}$ | ... | $M_{N-1,NR+NA}$ | $M_{N-1,NR+NA+1}$ | ... | $M_{N-1,NR+NA+NX}$ |
| DEVICE N | $M_{N,1}$ | ... | $M_{N,NR}$ | $M_{N,NR+1}$ | ... | $M_{N,NR+NA}$ | $M_{N,NR+NA+1}$ | ... | $M_{N,NR+NA+NX}$ |

NETWORK DISRUPTION MATRIX

FIG.10

$$M_\varepsilon = \begin{bmatrix} 0 & e_{1,2} & \cdots & e_{1,n-1} & e_{1,n} \\ e_{2,1} & 0 & \cdots & e_{2,n-1} & e_{2,n} \\ \cdots & \cdots & \cdots & \cdots & \cdots \\ e_{n-1,1} & e_{n-1,2} & \cdots & 0 & e_{n-1,n} \\ e_{n,1} & e_{n,2} & \cdots & e_{n,n-1} & 0 \end{bmatrix} \begin{matrix} d_1 \\ d_2 \\ \\ d_{n-1} \\ d_n \end{matrix}$$

$$\begin{matrix} d_1 & d_2 & & d_{n-1} & d_n \end{matrix}$$

CONNECTIVITY MATRIX

- ENTRIES ARE 1 IF THERE EXISTS A DIRECT CONNECTION BETWEEN DEVICES; OTHERWISE ENTRIES ARE 0

- A DEVICE CANNOT BE CONNECTED TO ITSELF (NO LOOPS)

- DEVICES ARE DENOTED $d_i$ WHERE i IS THE DEVICE ID

FIG. 11

| | |
|---|---|
| DEVICE ID | A |
| HARDWARE TYPE | 120 \| ROUTER |
| EOX DATE | NONE |
| OPERATING SYSTEM | OMITTED |
| SOFTWARE | OMITTED |
| CENTRALITY | OMITTED |
| SECURITY ALERTS | [ ] |
| SERVICE REQUESTS | [1] |

FIG.13A

| | |
|---|---|
| DEVICE ID | B |
| HARDWARE TYPE | 120 \| ROUTER |
| EOX DATE | NONE |
| OPERATING SYSTEM | OMITTED |
| SOFTWARE | OMITTED |
| CENTRALITY | OMITTED |
| SECURITY ALERTS | [1] |
| SERVICE REQUESTS | [ ] |

FIG.13B

| | |
|---|---|
| DEVICE ID | C |
| HARDWARE TYPE | 115 \| SWITCH |
| EOX DATE | NONE |
| OPERATING SYSTEM | OMITTED |
| SOFTWARE | OMITTED |
| CENTRALITY | OMITTED |
| SECURITY ALERTS | [2] |
| SERVICE REQUESTS | [2] |

FIG.13C

| | |
|---|---|
| DEVICE ID | D |
| HARDWARE TYPE | 115 \| SWITCH |
| EOX DATE | 2018-03-15 |
| OPERATING SYSTEM | OMITTED |
| SOFTWARE | OMITTED |
| CENTRALITY | OMITTED |
| SECURITY ALERTS | [2, 3] |
| SERVICE REQUESTS | [ ] |

FIG.13D

NETWORK SECURITY ADVISORY MATRIX

| ID | IMPACT RATING | INCIDENT WEIGHT | DATE ISSUED | DATE RESOLVED | DEVICES AFFECTED |
|---|---|---|---|---|---|
| 1 | MEDIUM | 2 | 2018-01-10 | 2018-01-14 | [B] |
| 2 | LOW | 1 | 2018-01-05 | 2018-01-21 | [C, D] |
| 3 | HIGH | 3 | 2018-01-13 | 2018-01-135 | [D] |

FIG. 14

NETWORK SERVICE REQUEST MATRIX

| ID | SEVERITY RATING | INCIDENT WEIGHT | DATE ISSUED | DATE RESOLVED | DEVICES AFFECTED |
|---|---|---|---|---|---|
| 1 | 2 | 3 | 2018-01-17 | 2018-01-19 | [A] |
| 2 | 4 | 1 | 2018-01-20 | UNRESOLVED | [C] |

FIG. 15

NETWORK EOX MATRIX

| ID | EOX DATE | DEVICES AFFECTED |
|---|---|---|
| 1 | 2018-07-15 | [D] |

FIG. 16 a network of devices for which a network disruption index may be calculated in accordance with an example embodiment.

SYSTEM AND METHOD TO ESTIMATE NETWORK DISRUPTION INDEX

CROSS REFERENCE TO RELATED APPLICATIONS

This application is a continuation of U.S. patent application Ser. No. 16/137,112, filed Sep. 20, 2018, which is incorporated herein by reference in its entirety.

TECHNICAL FIELD

The present disclosure relates to network monitoring and performance.

BACKGROUND

Network performance is crucial to business operations, yet administrators must often rely on outdated indicators for network management that enable primarily reactive, rather than proactive or pre-emptive, actions.

Traditional key performance indicators such as availability, utilization, latency and jitter are measurable quantities coming directly from information collected from the network infrastructure. While these traditional indicators serve as valuable measures of network health and functionality, they are inherently limited by the information they incorporate.

BRIEF DESCRIPTION OF THE DRAWINGS

FIG. 2 is a measure-weight matrix P used, in part, to calculate a network disruption index in accordance with an example embodiment.

FIG. 3 is a network device hardware matrix used, in part, to calculate a network disruption index in accordance with an example embodiment.

FIG. 4 is a network device software matrix used, in part, to calculate a network disruption index in accordance with an example embodiment.

FIG. 5 is a software type and version matrix used, in part, to calculate a network disruption index in accordance with an example embodiment.

FIG. 6 is an operating system matrix used, in part, to calculate a network disruption index in accordance with an example embodiment.

FIG. 7 is a network security advisory matrix used, in part, to calculate a network disruption index in accordance with an example embodiment.

FIG. 8 is a network service request matrix used, in part, to calculate a network disruption index in accordance with an example embodiment.

FIG. 9 is an end-of-life/end of service listings matrix, used, in part, to calculate a network disruption index in accordance with an example embodiment.

FIG. 10 is a network disruption measure matrix in accordance with an example embodiment.

FIG. 11 is a device connectivity matrix used, in part, to calculate a network disruption index in accordance with an example embodiment.

FIGS. 13A-13D depict nodes of an example network, and corresponding matrices shown in FIGS. 14-16 show how characteristics of the nodes are accounted for in various matrices in accordance with an example embodiment.

DESCRIPTION OF EXAMPLE EMBODIMENTS

Overview

Presented herein are methodologies for implementing a system and apparatus to estimate a network disruption index and undertake a mitigation action accordingly. In embodiment, a method includes calculating a network disruption index based on at least a disruption score associated with a service request measure, an end-of-life measure, a security incident response measure and a return material authorization measure for respective hardware devices in a network, comparing the network disruption index to a predetermined threshold, and when the network disruption index is above the predetermined threshold, identifying one or more of the hardware devices in the network for a mitigation action and implementing the mitigation action.

A device or apparatus is also described. The device may include an interface unit configured to enable network communications, a memory, and one or more processors coupled to the interface unit and the memory, and configured to: calculate a network disruption index based on at least a disruption score associated with a service request measure, an end-of-life measure, a security incident response measure and a return material authorization measure for respective hardware devices in a network, compare the network disruption index to a predetermined threshold; and when the network disruption index is above the predetermined threshold, identify one or more of the hardware devices in the network for a mitigation action and implement the mitigation action.

Example Embodiments

Figure 1:
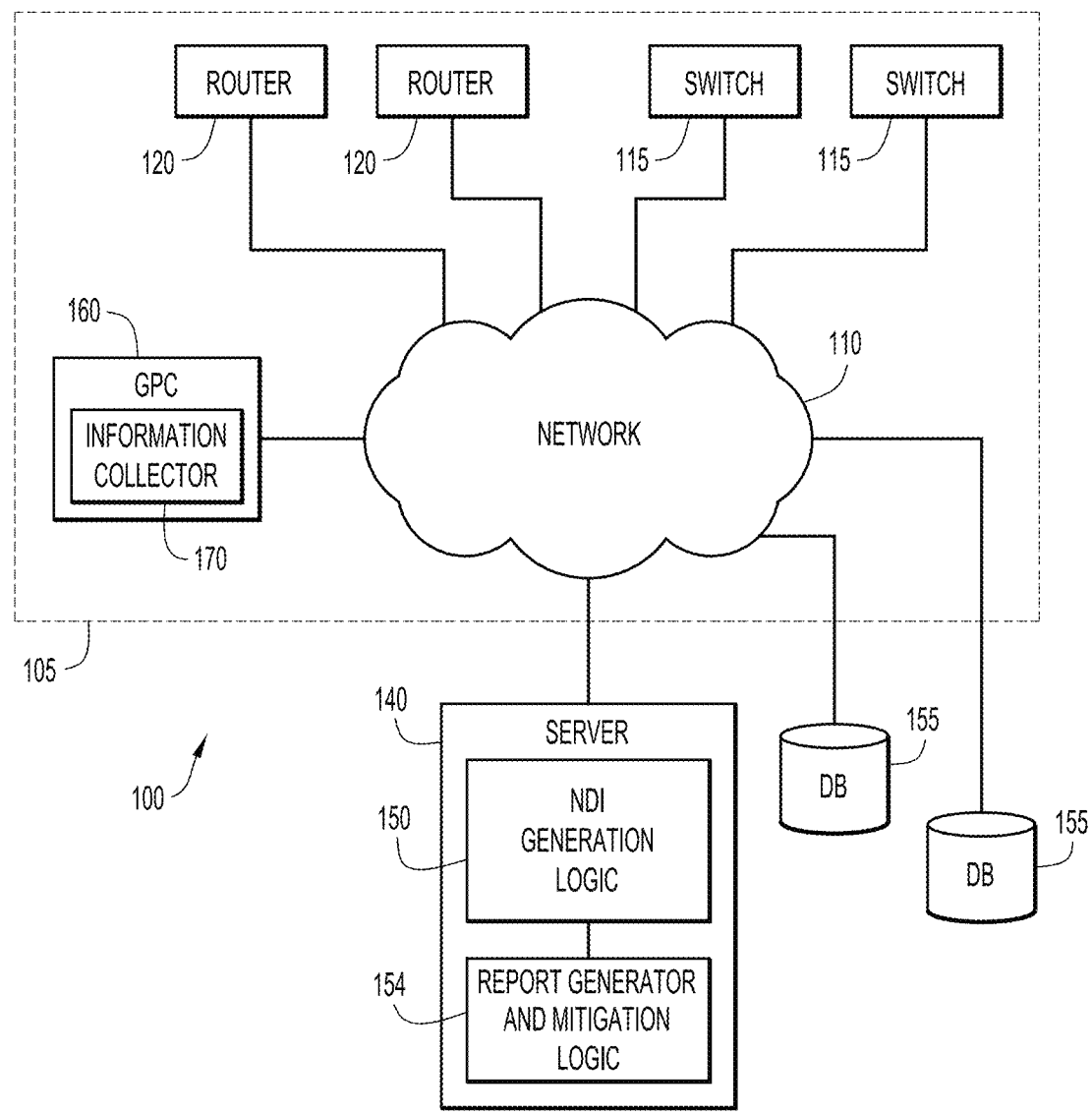
FIG. 1 depicts a network of devices for which a network disruption index may be calculated in accordance with an example embodiment.

FIG. 1 depicts a network of devices for which a network disruption index may be calculated in accordance with an example embodiment. A system 100 consistent with the principles described herein includes an electronic network 110 that interconnects several different components including a plurality of switches 115, a plurality of routers 120, a server 140, one or more databases 155, and a general purpose computer (GPC) 160. Network 110 may be any wired or wireless electronic network such as a local area network (LAN), wide area network (WAN), the Internet, a private network, or any suitable electronic physical plant that enables connectivity between the several other components connected thereto.

Switches 115 and routers 120 may be connected to still other like switches and routers (not shown) enabling end point nodes (such as computers, mobile devices, etc.) to communicate with one another or network servers using, e.g., TCP/IP or any other like protocol.

Server 140 (the physicality of which is described more fully with respect to FIG. 11) comprises Network Disruption Index (NDI) generation logic 150 (that will be described more fully below) and a report generator and mitigation logic 154 in communication with NDI generation logic 150 that is configured to receive data from NDI generation logic 150 and, using database(s) 155, generate and output reports for, e.g., human consumption. As will be explained more fully below, such reports may identify specific pieces of equipment or devices that may have a possible disruptive effect on the overall network of devices. Once a given device is identified, a specific mitigation action may be implemented to reduce the overall likelihood of network disruption.

Databases 155 may be physical repositories implemented through any combination of conventional Relational Database Management Systems (RDBMSs), Object Database Management Systems (ODBMSs), in-memory Database Management Systems (DBMSs), or through any other equivalent facility. Moreover, databases 155 are shown as being separate physical devices, however, those skilled in the art will appreciate that such databases may be combined into a single repository, or distributed into multiple repositories as long as the data being stored therein is accessible to server 140, and in particular NDI generation logic 150 being hosted thereon.

GPC 160 may be any general purpose computer, including a server that can be configured to collect information, using information collector 170, regarding the several pieces of equipment that are within "view" or "reach" of the information collector 170 within an enterprise zone 105.

At a high level, embodiments described herein employ information collector 170 to collect information, including a plurality of individual attributes characterizing the equipment or network devices (e.g., switches 115, routers 120, etc.) to which information collector 170 has access. Once this information is collected, it is passed to NDI generation logic 150 (and perhaps stored in database(s) 155), which processes the collected information, among other information, to determine an overall network disruption index value, a number that characterizes the health or stability of the network. Selected devices may be flagged as potentially disruptive in the near term, or in the longer term and reported via report generator and mitigation logic 154 to an administrator having responsibility over and/or ownership of enterprise 105.

I. Disruption Factors

Impactful network disruptions commonly arise from such technical services level factors as configuration issues, unplanned maintenance, and hardware issues or failure.

1. Service Requests

Many networking product vendors offer dedicated technical support to their customers, accessible upon request. Customers may submit service requests or open support cases with a vendor's technical support division. The information contained in service requests and support cases can provide visibility into the state of the network.

Customers with service contracts may have access to, e.g., a Technical Assistance Center (TAC) and personalized support from TAC engineers. Customers place service requests to receive support from the TAC on matters ranging from basic installation and configuration assistance to time-critical resolution of network outage.

When filing a service request, customers are often asked to include a severity rating. To help ensure that all service requests are reported in a standard format, levels may be labeled from severity 1 to severity 4 or 5 (or in colors: red, orange, yellow and green). The following is one example definition of four severity levels.

Severity 1 (S1): Network is "down" or there is a critical effect on business operations. Customer and service provider will commit all necessary resources around the clock to resolve the situation.

Severity 2 (S2): Operation of an existing network is severely degraded, or significant aspects of customer business operation are negatively affected by inadequate performance of one or more products. Customer and service provider will commit fulltime resources during normal business hours to resolve the situation.

Severity 3 (S3): Operational performance of network is impaired, while most business operations remain functional. Customer and service provider are willing to commit resources during normal business hours to restore service to satisfactory levels.

Severity 4 (S4): Customer is in need of information or assistance with product capabilities, installation, or configuration. There is little or no effect on customer business operations.

2. End of Life

A product end-of-life process comprises of a series of technical and business milestones and activities that, once completed, make a product obsolete. The following are endpoints in the product lifecycle, collectively referred to as EOX.

End-of-sale: Product no longer offered for purchase from vendor point-of-sale.

End-of-service: Vendor no longer provides maintenance, troubleshooting or other support for the product.

End-of-life: Product is obsolete from vendor point of view, and is not sold, manufactured, improved, repaired, maintained, or supported by vendor.

The specifics of the product end-of-life process vary according to vendor and product specifics. In some cases, vendors may support a product past EOX for some set amount of time for customers with service contracts.

The following is an example of how to define, temporally, an EOX event

REACHED: EOX date reached.

NEAR: EOX date approaching within 6 months.

OTHER: EOX date more than 6 months away, EOX date not yet announced, or EOX not available.

Vendors may provide advance notice of product EOX according to internal policy specifications. One industry standard is that notice of an EOX event is given at least six months in advance.

3. Security Advisories and Alerts

Vendors and third parties work to put out security advisories and alerts on products whenever they arise. The Common Vulnerability Scoring System (CVSS) is a standardized system for rating potential vulnerabilities. It is used by many organizations and companies.

In addition to CVSS scores, NDI generation logic 150 may use the Security Impact Rating (SIR) as a way to categorize vulnerability severity in a simpler manner. The SIR is based on the CVSS Qualitative Severity Rating Scale of the base score, and may be adjusted by a Product Security Incident Response Team (PSIRT) measure to account for vendor-specific variables, and the SIR may be included in a vendor Security Advisory. The following guidelines may be used to determine a Security Advisory type.

| SECURITY ADVISORIES | |
|---|---|
| SIR<br>Security Impact Rating | VCSS<br>Common Vulnerability Scoring System |
| CRITICAL | 9.0-10.0 |
| HIGH | 7.0-8.9 |
| MEDIUM | 4.0-6.9 |
| LOW | 0.1-3.9 |

4. Index Formula

Measures and Weights

The following measures are functions of a device $d_k$. For notational simplicity, the argument is dropped when defining each measure.

Service Requests

Let $N_S$ denote the number of severity ratings available for a service request. In the present example, $N_S=4$. Let s be the column vector consisting of entries $s_i$, where $i \in \mathbb{N}$, $1 \leq i \leq N_S$ and each $s_i$ is the count of open service requests of severity rating i. Severity ratings are assigned on a scale of 1 to $N_S$, with severity level 1 being the most severe and severity level $N_S$ the least.

Let $w_S$ be the row vector with entries $w_{s,i}$ given by $w_{s,i}=N_s+1-i$:

$$w_s=[N_s \ldots 2 \ 1]$$

which in the case of the current TAC severity rating scale is simply $$w_s=[4 \ 3 \ 2 \ 1].$$

End of Life/End of Service

Let $N_D$ denote the number of available EOX statuses. Let d be the column vector consisting of binary entries $d_i$, where $i \in \mathbb{N}$, $1 \leq i \leq N_D$ and each $d_i$ signifies whether or not a status of End of Life/End of Service (EOX) has been reached.

If the status has been reached, then $d_i=1$, and if not, $d_i=0$. Each i denotes an EOX status, with i=1 indicating that EOX has already been reached and larger values of i signifying a longer amount of time before EOX is reached.

Note that at most one entry $d_i$ can be nonzero for any d.

Let $w_D$ be the row vector with entries $w_{D,i}$ given by $w_{D,i}=N_D+1-i$:

$$w_D=[N_D \ldots 2 \ 1]$$

In practice, $N_D=3$ is chosen and define the following EOX states:

i=1 EOX reached, i=2 EOX upcoming in fewer than 6 months, and

The associated weight vector $w_D$ is then $$w_D=[2 \ 1].$$

PSIRTs

Let $N_P$ be the number of ratings available on the scale of PSIRT severity. In practice, PSIRT severity is assigned in terms of Common Scoring System (CSS) ratings, which range from 0.0 to 10.0. In order to obtain an integer number of ratings, CSS ratings are chunked into ten blocks, each of width 1.0. Thus, the first rating block contains CSS ratings less than 1.0, the second rating block contains CSS ratings less than 2.0 and greater than or equal to 1.0, and so on.

Let p be the column vector consisting of entries $p_i$, where $i \in \mathbb{N}$, $1 \leq i \leq N_P$ and each $p_i$ is the count of security alerts with CSS rating between i and i-1. Recall that CSS ratings are assigned on a scale of 0.0 to 10.0. The i to which a PSIRT of CSS rating $r \in \mathbb{R}$ is assigned may be computed by:

$$i \leftarrow \text{floor}(r)+1.$$

Let $w_P$ be the row vector with entries $w_{P,i}$ given by $w_{P,i}=i$:

$$w_P=[1 \ 2 \ 3 \ldots N_P]$$

In practice, $$w_P=[1 \ 2 \ 3 \ldots 10].$$

Return Material Authorization (RMA)

Let m be the binary variable signifying whether or not a return material authorization (RMA) is open. If an RMA is open, m=1; otherwise m=0.

Since m is not vector-valued, it is possible to simply define weight $w_m=1$.

Disruption Factor Functions

For each measure, a function is defined that computes device disruption effected by that measure. These functions are defined in terms of the dot product of the vector-valued variable with its associated weight vector. Note that each of these functions is defined on a device-by-device basis. The disruption factor functions may be defined as:

SR-dependent $\mathcal{S}(s)=w_s \cdot s(d)$

EOX-dependent $\mathcal{D}(d)=w_D \cdot d(d)$

PSIRT-dependent $\mathcal{P}(p)=w_P \cdot p(d)$.

RMA-dependent $\mathcal{M}(m)=w_m m$

Collectively, these functions constitute a set of $\mathcal{F}$ functions:

$$\mathcal{F}:=\{\mathcal{S}, \mathcal{D}, \mathcal{P}, \mathcal{M}\}$$

The outputs of these functions for device d form a set $\mathcal{F}(d)$ of real numbers:

$$\mathcal{F}(d):=\{\mathcal{S}(d), \mathcal{D}(d), \mathcal{P}(d), \mathcal{M}(d)\}.$$

II. Generalized Framework

A more general framework is defined as follows.

Assume that a network contains m devices and that n measures (e.g. SR, EOX, PSIRT, RMA, etc.) are available for network disruption analysis. Let $\mathcal{N}:=\{d_1, \ldots, d_n\}$ be the set of all devices in a network and $\mathcal{M}:=\{M_1, \ldots, M_m\}$ the set of available measures. Partition each $M_i$ into categories $C_{i,j}$ according to magnitude of potential disruption impact. Let $p_i$ denote the number of categories in $M_i$ and $\mathcal{C}_i:=\{C_{i,1}, \ldots, C_{i,p_i}\}$ the set of categories in $M_i$.

For each measure, assign points by category proportional to potential disruption impact. Let P(i, j) denote the points allocated to $C_{i,j}$, category j in measure i, and define $P^i$ to be the row vector with entries $P_j^i$ given by $$P_j^i=P(i,j).$$

Define row vector $w^i$ entry wise with each entry $w_j^i$ given by $$w_j^i = \frac{p(i,j)}{\|p^i\|_1} = \frac{p(i,j)}{\Sigma_j p(i,j)}.$$

Now $w^i$ is the weight vector for measure i. By construction, the weights sum to one as $$\|w^i\|_1 = \Sigma_j w_j^i = 1.$$

Construct indicator function $\mathcal{B}$ by $\mathcal{B}$ : (i,j,k) → 1 if $C_{i,j}$ is non-empty for device $d_k$, and $\mathcal{B}$ : (i,j,k) → 0 otherwise.

For intuition, consider the following example:

If the $i^{th}$ measure is "service requests" with $j^{th}$ partition is "service requests of severity rating 3," then $\mathcal{B}$ (i,j,k) returns 1 if $d_k$ has an open service request of severity rating 3 and 0 if it does not.

Define vector $v^i$ as the column vector of length $p_i$ with entries $v_j^i$ given by $$v_j^i(k) = \mathcal{B}(i,j,k).$$

For each measure $M_i$, define disruption factor function $f_i$ by $$f_i(k) = w^i \cdot v^i(k)$$

with $w^i$ and $v^i$ defined as above for device $d_k$.

Let $\mathcal{F} := \{f_1, \ldots, f_m\}$ be the set of disruption factor functions, and let $f$ denote the vector of length m with entries given by $(i)=f_i$, $1 \le i \le m$. The disruption factors may not contribute uniformly to the overall network or device disruption, so a second weight (or vector) is employed. Let u be the weight vector of length m with entries $u_i$ proportional to the magnitude of the contribution of the respective factor function $f_i$ to overall disruption, and assume without loss of generality that the entries of u sum to one, i.e. $\|u\|_1 = 1$. Note that if $\|u\|_1 \ne 1$ by initial construction, it is possible to simply redefine u as the weight vector of length m with entries $$u_i \leftarrow \frac{u_i}{\|u\|_1}.$$

Single Device Disruption

A disruption index is computed for individual devices in terms of the disruption factor functions. The disruption index $\mathcal{R}$ for device $d_k$ is given by $$\mathcal{R}(k) = u \cdot f(k) = \sum_{i=1}^{m} u_i f_i(k) = \sum_{i=1}^{m} u_i w^i \cdot v^i(k) = \sum_{i=1}^{m} u_i \sum_{j=1}^{p_i} w_j^i v_j^i(k).$$

$\mathcal{R}$ may be written in terms of the indicator function $\mathcal{B}$ if desired as $$\mathcal{R}(k) = \sum_{i=1}^{m} u_i \sum_{j=1}^{p_i} w_j^i \mathcal{B}(i,j,k).$$

It is not necessary to compute the weight vectors $w^i$ with entries $$w_j^i = \frac{P(i,j)}{\|P^i\|_1} = \frac{P(i,j)}{\Sigma_j P(i,j)}$$

explicitly; instead, the weight computations may be embedded in the formula for $\mathcal{R}$ (k) as $$\mathcal{R}(k) = \sum_{i=1}^{m} \frac{u_i}{\|P^i\|_1} \sum_{j=1}^{p_i} P(i,j) \mathcal{B}(i,j,k).$$

Note that embedding the weight computations in this manner improves computation efficiency by reducing the number of FLOPs (floating Point Operation Per Second) required to compute $\mathcal{R}$ (k). For networks with many devices, each requiring the computation of $\mathcal{R}$ (k), the cumulative effect may be noticeable.

Special Case: Equal Factor Contribution

If it may be assumed that each $f_i \in \mathcal{F}$ contributes equally to disruption (or if the weight vector u is not defined), then take $$u_i = \frac{1}{m} \text{ for } 1 \le i \le m.$$

Note that in this case the number of FLOPs required may be reduced by rewriting the disruption index for device $d_k$ as $$\mathcal{R}(k) = \frac{1}{m} \sum_{i=1}^{m} f_i(k) = \frac{1}{m} \sum_{i=1}^{m} w^i \cdot v^i(k) = \frac{1}{m} \sum_{i=1}^{m} \sum_{j=1}^{p_i} w_j^i v_j^i(k).$$

In terms of the indicator function $\mathcal{B}$, the device disruption index is given by $$\mathcal{R}(k) = \frac{1}{m} \sum_{i=1}^{m} \sum_{j=1}^{p_i} w_j^i \mathcal{B}(i,j,k)$$

or, with embedded weight computations, by $$\mathcal{R}(k) = \sum_{i=1}^{m} \frac{1}{\|P^i\|_1} \sum_{j=1}^{p_i} P(i,j) \mathcal{B}(i,j,k).$$

Network Disruption

Recall that $\mathcal{N}$ is the set of all network devices $d_k$, $1 \le k \le N_{dev}$, where $N_{dev}$ is the number of devices in the network.

Let c be the weight vector of length $N_{dev}$ with entries $c_k$ computed as a measure of the centrality of device $d_k$ within the network, with larger $c_k$ signifying greater centrality. The value c is referred to as the centrality weight vector, and the construction of c is discussed in a later section. Assume for now that larger $c_k$ signifies higher centrality of device $d_k$ and that $\|c\|_1 = 1$.

Let $\mathcal{A}(\mathcal{N})$ denote the network disruption index. $\mathcal{A}$ is defined as a function of device disruption as follows:

$$\mathcal{A}(\mathcal{N}) = \sum_{k:d_k \in \mathcal{N}} c_k \mathcal{R}(k)$$

where the notation k: $d_k \in \mathcal{N}$ means all k for which device $d_k$ is in $\mathcal{N}$, the set of all network devices.

Network Subset Disruption

Note that it is possible to choose some other subset of $\mathcal{N}$ over which to compute $\mathcal{A}$. Let $\mathcal{B} \subseteq \mathcal{N}$ be any subset of devices in $\mathcal{N}$. Then the system may compute the disruption index over $\mathcal{B}$ as $$\mathcal{A}(\mathcal{B}) = \sum_{k: d_k \in \mathcal{B}} b_k \mathcal{R}(k) \qquad (5)$$

where, similarly, the notation k: $d_k \in \mathcal{N}$ means all k for which device $d_k$ is in $\mathcal{B}$.

Note that $b_k$ has been used rather than $c_k$. The centrality weight vector is constructed such that it has unit 1-norm, so in the case $\mathcal{B} \neq \mathcal{N}$, c cannot be the centrality weight vector for $\mathcal{B}$. Instead, a new centrality weight vector b should be constructed from c by zeroing all $c_k$ such that $d_k \notin \mathcal{B}$ and renormalizing the new vector to have unit 1-norm. The following Subset Centrality Weight Vector Construction algorithm may be used for this purpose:

```
r ← 0
for 1 ≤ k ≤ N_dev
    if d_k ∈ B
        b_k ← c_k
        r ← r + b_k
    else
        b_k ← 0
    end
end
b ← (1/r) b
```

Implementation

A methodology to implement the NDI logic may include the following.

Construct the following global sets:

1. All hardware (HW) product types (routers, switches, etc.)
2. All product series within a given HW product type
3. All product models within a given product series
4. All possible operating systems (OSs) that might be installed on a HW product
5. All possible software that might be installed on a HW product
6. All configuration options for HW product Construct the following network-specific sets:

1. All HW product serial numbers in the network
2. All HW product models in the network
3. All HW product series in the network
4. All HW product types in the network
5. All OS in the network
6. All software (SW) installed in the network Define one of the following three sets additionally:

1. The set of undirected connections between devices
  a. Default option
  b. Assume that any connection is bidirectional, i.e. if device d1 can send information to device d2, it is always the case that device d2 can send information to device d1
  c. Assume a device cannot be connected to itself (no loops)
  d. Denote connections by tuples (di,dj)
  e. Since the order of the tuple does not matter, enforce order such that di<dj for all (di,dj)

2. The set of directed connections between devices
  a. Option if bidirectionality cannot be assumed
  b. Do not assume connections are bidirectional
  c. Tuples are ordered, with the first entry of the tuple being the receiving device and the second entry the sending device
  d. i.e., if device d1 can send information to device d2, this can be denoted as the directed connection (d2,d1)

3. The set of directed or undirected connections between devices along with the maximum throughput of the connection
  a. If throughput data is available, use this option along with one of the first two
  b. Entries are triplets (di, dj, tij)
  c. Throughput in units of bits per second Formalisms The following variables indicated in the following framework notation table are employed in connection with the several equations set forth below.

Framework Notation

| | |
|---|---|
| $\mathcal{A}$ | Network services disruption index |
| $\mathcal{R}(k)$ | Device disruption score |
| $\mathcal{R}_H(k)$ | Device hardware disruption score |
| $\mathcal{R}_O(k)$ | Device operating system disruption score |
| $\mathcal{R}_{S_i}(k)$ | Device software disruption score, one software product |
| $\mathcal{R}_S(k)$ | Device software disruption score |
| n | Number of network devices |
| $d_k$ | The kth network device |
| $\mathcal{N}$ | The set of network devices |
| m | Number of disruption measures (e.g. service requests, security advisories, EOX) |
| $M_l$ | The lth disruption measure |
| $\mathcal{M}$ | The set of disruption measures |
| $p_i$ | Number of categories (e.g. severity or impact ratings) within disruption measure i |
| $C_{i,j}$ | The jth category of the ith disruption measure |
| $\mathcal{C}_i$ | The set of categories of the ith disruption measure |
| P(i, j) | The points allocated to the jth category of the ith disruption measure |
| $\mathcal{B}(i, j, k)$ | The indicator function yielding 1 if $C_{i,j}$ is non-empty for device $d_k$ and 0 otherwise |
| $\|\cdot\|_1$ | The taxicab norm (sum of vector entries) |

Equations

Network disruption $\mathcal{A}$ of network $\mathcal{N}$ is calculated as the weighted summation of device disruption scores for all network devices:

$$\mathcal{A}(\mathcal{N}) = \sum_{k: d_k \in \mathcal{N}} c_k \mathcal{R}(k) \qquad (1)$$

where $\mathcal{N}$ is the set of all network devices, $c_k$ is the kth entry of the unit 1-norm vector c which provides the relative weights of each network device in accordance with its functionality classification and $\mathcal{R}(k)$ is the disruption score of device k.

Hardware

Identify device disruption due to disruption measures impacting device hardware. Denote device disruption: hardware by $\mathcal{R}_H(k)$ for device $d_k$ and define it as follows:

$$\mathcal{R}_H(k) = \sum_{i=1}^{m} \frac{u_i}{\|P^i\|_1} \sum_{j=1}^{p_i} P(i, j) \mathcal{B}_H(i, j, k) \qquad (2)$$

where $\mathcal{B}_H(i,j,k)$ is the indicator function for disruption measures impacting operating system only; i.e. $\mathcal{B}_H(i,j,k)$ is the indicator function yielding 1 if $C_{i,j}$ is non-empty for the operating system of device $d_k$ and 0 otherwise.

Operating System

Define a category separate from all other software installs for operating system only as the impact of operating system on device function is at a different level than that of all other software installs.

Denote device disruption: operating system by $\mathcal{R}_O(k)$ for device $d_k$ and define it as follows:

$$\mathcal{R}_o(k) = \sum_{i=1}^{m} \frac{u_i}{\|P^i\|_1} \sum_{j=1}^{p_i} P(i,j) \mathfrak{B}_o(i,j,k)$$

where $\mathfrak{B}_O(i,j,k)$ is the indicator function for disruption measures impacting operating system only; i.e. $\mathfrak{B}_O(i,j,k)$ is the indicator function yielding 1 if $C_{i,j}$ is non-empty for the operating system of device $d_k$ and 0 otherwise.

This formula can be modified for dual-boot or similar cases in which a device has more than one operating system.

Software

Identify device disruption arising from software installed; note that the operating system of the device is not included in this category.

Since a device may have multiple software installs, software-based device disruption is calculated as a weighted sum over all software installs on the device. This function is similar in form to that of network disruption, which computes a weighted sum over all devices in the network.

Denote single install software-based device disruption by $\mathcal{R}_{S_l}(k)$ for software install $S_l$ on device $d_k$ and define it as follows:

$$\mathcal{R}_{S_l}(k) = \sum_{i=1}^{m} \frac{u_i}{\|P^i\|_1} \sum_{j=1}^{p_i} P(i,j) \mathfrak{B}_{S_l}(i,j,k) \quad (3)$$

Denote software-based device disruption by $\mathcal{R}_S(k)$ for device $d_k$ and define it as follows:

$$\mathcal{R}_s(k) = \frac{1}{\|P_{SW}(k)\|_1} \sum_{l=1}^{N_S} P_{SW}(l,k) \mathcal{R}_{S_l}(k) \quad (4)$$

where $P_{SW}(k)$ is the weight vector with entries $P_{SW}(l,k)$ proportional to the impact of software install $S_l$ on device $d_k$ relative to the other software installs on device $d_k$.

Software installs may be categorized as Critical or Non-Critical. Critical installs have $$P_{SW}(l,k)=1 \quad (5)$$

and Non-Critical installs have $$P_{SW}(l,k)=1/N_S. \quad (6)$$

Device Disruption

Measure Chunking Approach

In an embodiment, NDI generation logic 150 computes all device disruption functions separately, i.e. compute the hardware-based disruption function, operating system-based disruption function and all single install software-based disruption functions before computing the overall device disruption function.

For this approach, denote device disruption $\mathcal{R}(k)$ for device $d_k$ and define it in terms of its dot product with associated weight vector as follows:

$$\mathcal{R}(k) = \mathbf{W}_\mathcal{R} \cdot \boldsymbol{\mathcal{R}}(k) \quad (7)$$

where $\boldsymbol{\mathcal{R}}(k)$ is the vector $$\boldsymbol{\mathcal{R}}(k) = [\mathcal{R}_H(k)\, \mathcal{R}_O(k)\, \mathcal{R}_S(k)]^T \quad (8)$$

and $\mathbf{W}_\mathcal{R}$ is the unit 1-norm weighting vector defining the relative impacts of hardware disruption, operating system disruption, and software disruption on a device.

Indiscriminate Approach

Version 1

$$\mathcal{R}(k) = \sum_{i=1}^{m} \frac{u_i}{\|P^i\|_1} \sum_{j=1}^{p_i} P(i,j) \mathfrak{B}(i,j,k) \quad (9)$$

where $u_i$ is the ith entry of the unit 1-norm vector u which gives the relative weights of each disruption measure.

This version facilitates computation of disruption measure-specific indexes for each device.

Version 2

$$\mathcal{R}(k) = \frac{1}{\Sigma_i \|P^i\|_1} \sum_{i=1}^{m} \sum_{j=1}^{p_i} P(i,j) \mathfrak{B}(i,j,k) \quad (10)$$

This version uses the measure-weight matrix. It allows for more straightforward comparison in weighting between individual categories within disruption measures; e.g. service requests of severity 3 and security advisories of medium impact rating Differences between the described chunking approach and the indiscriminate approach include, but are not limited, to the following. There are two components to address, namely (1) the difference in intermediate components and (2) the functionality of the score itself. There are a number of options for how to take all of the information that goes into computing the disruption score and distill it into meaningful chunks that can then be processed to produce the disruption score (or NDI). It may be desirable to keep track of intermediate components to enable proper analysis into the factors of disruption. In the interest of computational tractability, once these intermediate components are produced, the data used to calculate them may be (and often is) discarded. This means that some information is "lost" in the sense that further analysis will be performed only on intermediate components or further processed data, so there is a decision to be made regarding what intermediate components to choose. The choice is based on an appropriate balance of facility to store in memory and sufficiently detailed.

In the measure chunking approach, NDI generation logic 150 computes three types of single device disruption scores—one for hardware, one for software, one for operating system—and store these as intermediate components, computing the disruption score from there. That means that the logic does not store information that provides insight into the "within" of each of these categories (necessarily), but NDI generation logic 150 can nevertheless conduct analysis on the comparative impact of HW vs SW issues on disruption.

The Indiscriminate Approach allows NDI logic 150 to calculate the score without storing any intermediate components at all, if so desired, or by nature of the matrix product involved, could store an intermediate component for every entry of the measure-weight matrix for each device, but the calculation is not designed to distinguish between HW and SW as sources of disruption.

Thus, in measure chunking, HW/SW/OS disruption are given a fixed amount of impact on the overall disruption score (e.g., weights: HW~0.5, SW~0.2 and OS~0.3), whereas in Indiscriminate Approach all disruption incidents contribute according to severity but not according to HW/SW/OS distinction. Thus, measure chunking implicitly limits the "amount" of disruption that the SW, say, of a device can contribute—even if the device is totally useless because of the disruption to the SW of the device, the overall score will not reflect as much disruption as if the issue were coming from disruption to the HW. It is noted that a SW issue frequently will not take as much time to resolve as a HW issue, and should leave other SW functions intact.

Disruption Measure Contribution to Network Disruption Score

Hardware

NDI generation logic 150 determines the contribution of hardware disruption to overall network disruption.

Denote network hardware disruption by $\mathcal{A}_H$ and define it as follows:

$$\mathcal{A}_H = \Sigma_{k:\, d_k \in \mathcal{N}} c_k \, \mathcal{R}_H(k) \qquad (11)$$

where $c_k$ is the kth entry of the unit 1-norm vector c which provides the relative weights of each network device in accordance with its functionality classification.

Operating System

Determine the contribution of operating system disruption to overall network disruption.

Denote network operating system disruption by $\mathcal{A}_O$ and define it as follows:

$$\mathcal{A}_O = \Sigma_{k:\, d_k \in \mathcal{N}} c_k \, \mathcal{R}_O(k) \qquad (12)$$

where $c_k$ is the kth entry of the unit 1-norm vector c which provides the relative weights of each network device in accordance with its functionality classification.

Software

Determine the contribution of software disruption to overall network disruption.

Denote network software disruption by $\mathcal{A}_S$ and define it as follows:

$$\mathcal{A}_S = \Sigma_{k:\, d_k \in \mathcal{N}} c_k \, \mathcal{R}_S(k) \qquad (13)$$

where $c_k$ is the kth entry of the unit 1-norm vector c which provides the relative weights of each network device in accordance with its functionality classification Weight Assignment FIG. 2 is a measure-weight matrix P in accordance with an example embodiment. As can be seen in the figure, increasing weight corresponds with increasing service request severity, impact of a security advisory, and impact of an EOX event.

Device Weight

Device weights can be assigned by device functionality, as follows:

Core: 3 points
Distribution: 2 points
Access: 1 point

Such weights can be further normalized, as follows:

Core weight=0.50
Distribution weight=0.33
Access weight=0.17

Device weight can also be assigned by centrality, in which case a "betweenness centrality" score, i.e., a measure of centrality in a graph based on shortest paths, may be employed.

Time-Dependent Weighting

It may also be assumed that the longer an incident is active, the greater impact it has on network disruption. With this in mind, a time-depending scaling factor that goes as log 10 of the number of days an incident has been active may be employed. The following equation captures time dependence.

$$1 + \log(\text{numdays} + 1) \qquad (14).$$

The time scaling factor is selected to appropriately represent the impact of network incidents going unresolved on network disruption. It may be tuned by adjusting the value of the constant, c, for $c \geq 0$, where c=0 signifies no change in incident impact over time/no penalty for slow incident resolution. Note that selecting c=1 and using the base ten logarithm results in a scaling factor of two at n=10, which signifies that incident impact doubles after ten days unresolved.

$$t(n) = 1 + c \log n, c \geq 0, n \text{ is the number of days since incident start}$$

Most generally, the time scaling factor should take the form $$t(n) = 1 + f(n)$$

where f(n) is some monotonically increasing (or at least non-decreasing) non-negative function of n. It is noted that an incident should not have less impact over time until resolved. It is possible for the time scaling factor to be tuned within a network so as to suit particularities of different incident types (i.e. EOX events might be assigned one time scaling factor, security advisories another, and service requests yet another).

The following overall methodology may be implemented by NDI generation logic 150.

Data Structuring

NDI generation logic 150 may structure data into matrices or data frames, as follows. It is noted that alternative structures (in particular, sparse representations) may also be employed in order to take advantage of the particularities of the language chosen for the implementation rather than the precise matrix structures depicted here.

1. Install Base
   Hardware Matrix (see FIG. 3, which keeps track of HW class, HW model and HD function $H_{N,N}$)
   Software Matrix (see FIG. 4, which keeps track of SW types and versions installed on each device $S_{N,NS}$)
   Software ID Matrix (see FIG. 5, which provides more granular SW type and version information)
   Operating System Matrix (see FIG. 6, which provides information regarding operating system type, version and special features enabled, for each device.)
2. Disruption Measures
   Security Advisory Matrix (see FIG. 7, which provides network advisory $A_{NA}$ information)
   Service Request Matrix (see FIG. 8, which provides network request $R_{NR}$ information)
   End-of-Life Matrix (see FIG. 9, which provides information regarding the EOX of hardware, operating system, software, the type of EOX, the version of the element reaching an EOX event, details about such element or EOX event, and devices affected)
   Network Disruption Measure Matrix (see FIG. 10, which provides information regarding service advisories, service requests, and EOX events)

FIG. 11 depicts a connectivity matrix in accordance with an example embodiment. It is noted that the centrality measure may be computed from such a connectivity matrix. In one actual implementation, however, device type was used to be indicative of centrality. Using a connectivity matrix representation of the specific embodiment along with one of a number of known "centrality" measures (or equivalently, "flow" measures described in network theory literature) could provide a better measure of device centrality as it would be tailored to the network at hand and could better reflect nuances of device centrality rather than a rough categorization of devices into three levels of centrality as is the case in a this particular implementation. That being said, the computation of these centrality or flow measures from the device connectivity matrix may be non-trivial and for that reason the option of centrality categorization based on device type (or user input) may be more convenient in many cases, particularly with standard network architectures. Computing centrality from the device connectivity matrix would be most valuable in certain cases of newer network architectures where computing is highly distributed and there is perhaps no intuitively clear definition of what is central.

NDI generation logic 150, once the aforementioned matrices are set up, computes incident weight.

Figure 12:
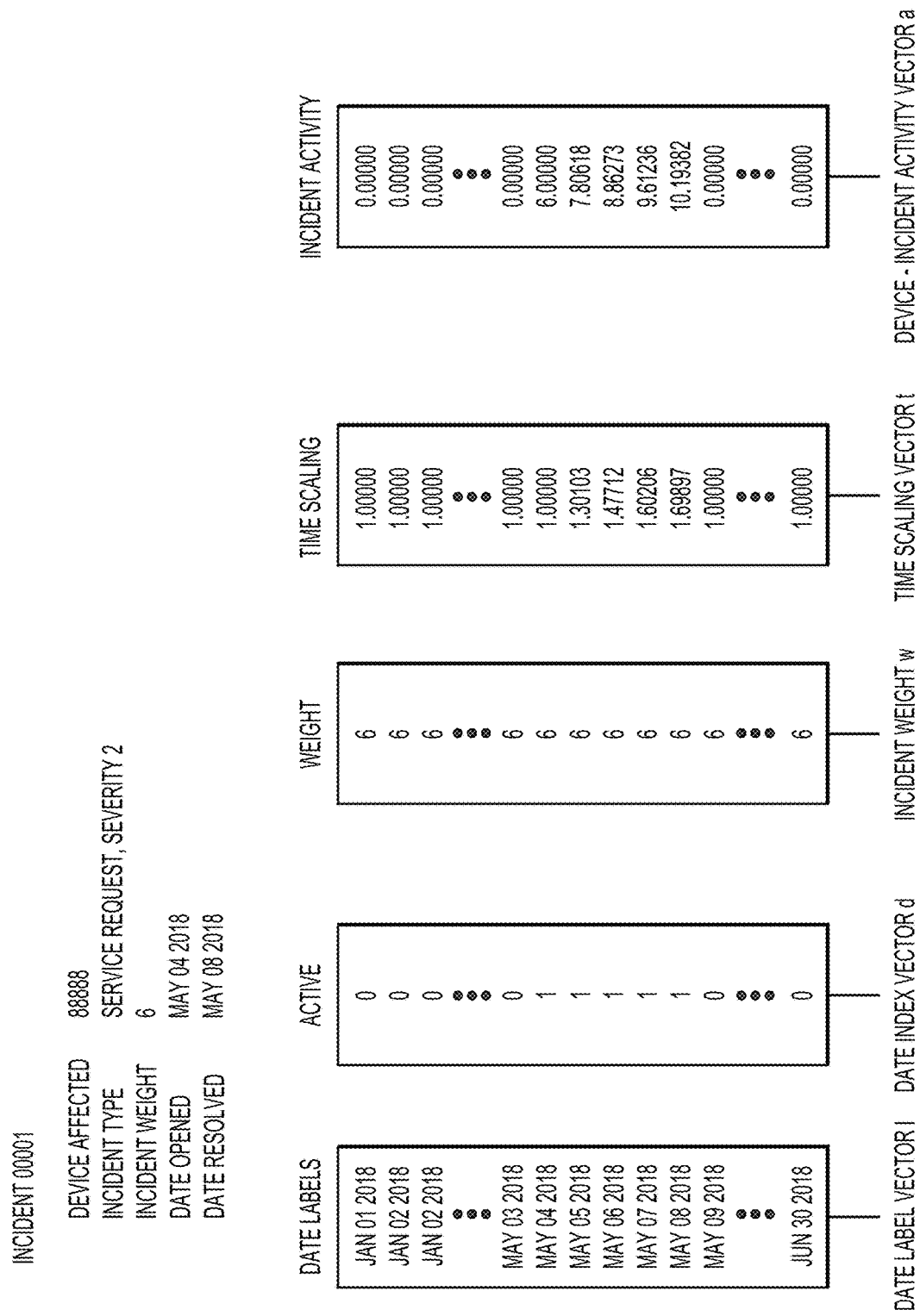
FIG. 12 depicts a series of vectors used to track each incident per device and used, in part, to calculate a network disruption index in accordance with an example embodiment.
Figure 17:
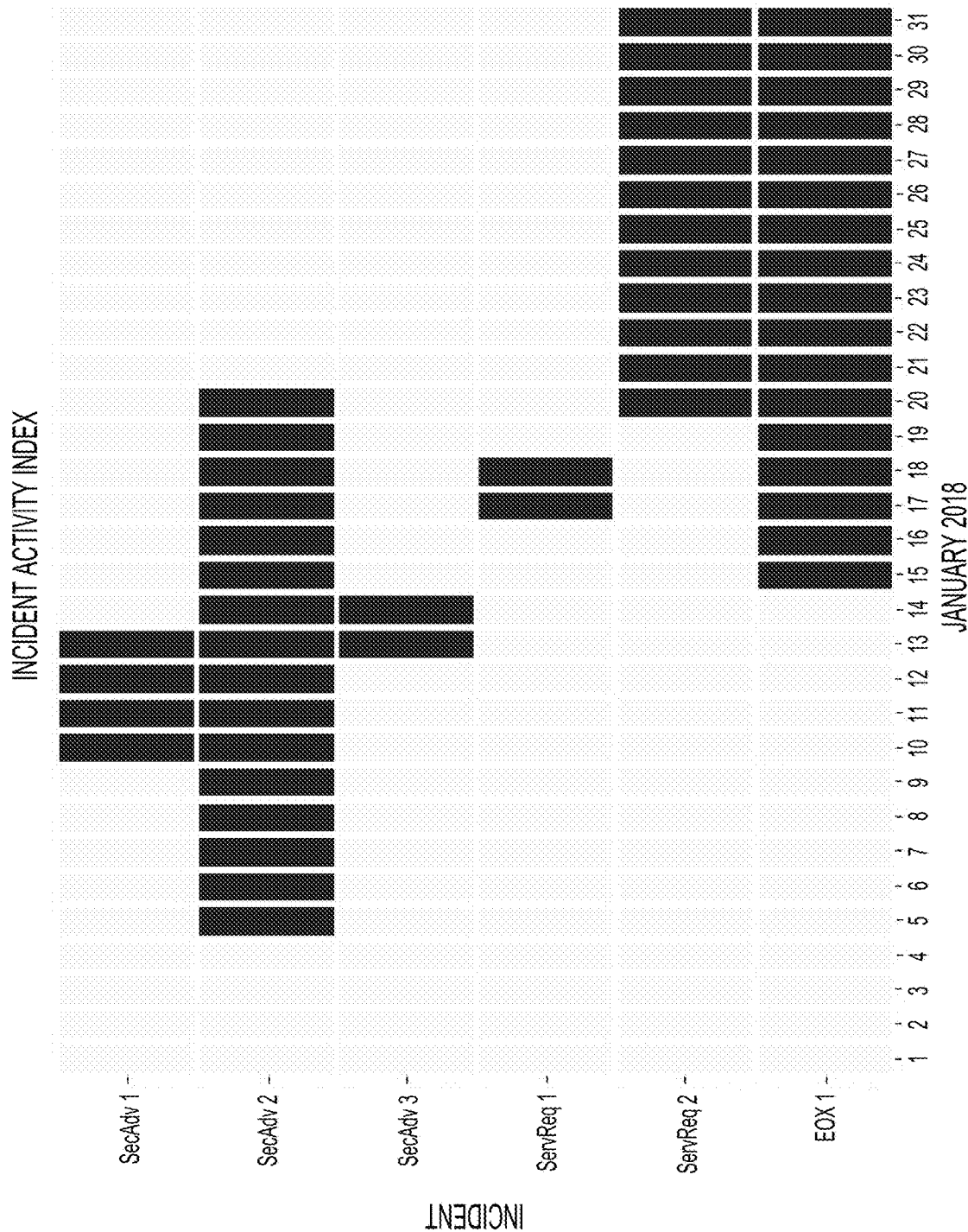
FIGS. 17-20 graphically depict the data and results of matrix calculations for an example month of data in accordance with an example embodiment.

Thereafter, NDI logic 150:

Finds dates a given incident is active and stores the same to a date index vector d where dates are considered as 1 if active, 0 if not (see FIG. 12, which depicts a series of vectors used to track each incident per device and used, in part, to calculate a network disruption index in accordance with an example embodiment Multiplies date index vector by incident weight vector w (FIG. 12)

Takes inner product of resulting scaled date index vector with a second vector, namely, a time dependence vector, time scaling vector t (FIG. 12)

The time dependence vector is defined as follows:

$$v_{time}(i):=1+\log(i)$$

The approach takes the inner product of the nonzero portion of the scaled date index vector with the time dependence vector.

FIGS. 13A-13D depict four nodes of an example network, and corresponding matrices shown in FIGS. 14-16 show how characteristics of the nodes are accounted for. That is, for each device A, B, C, D in FIGS. 13A-13D, the network security advisories, network service requests, and EOX events are populated into the matrices of FIGS. 14-16. These matrices are then used to calculate a network disruption score using the approaches discussed above.

Figure 18:
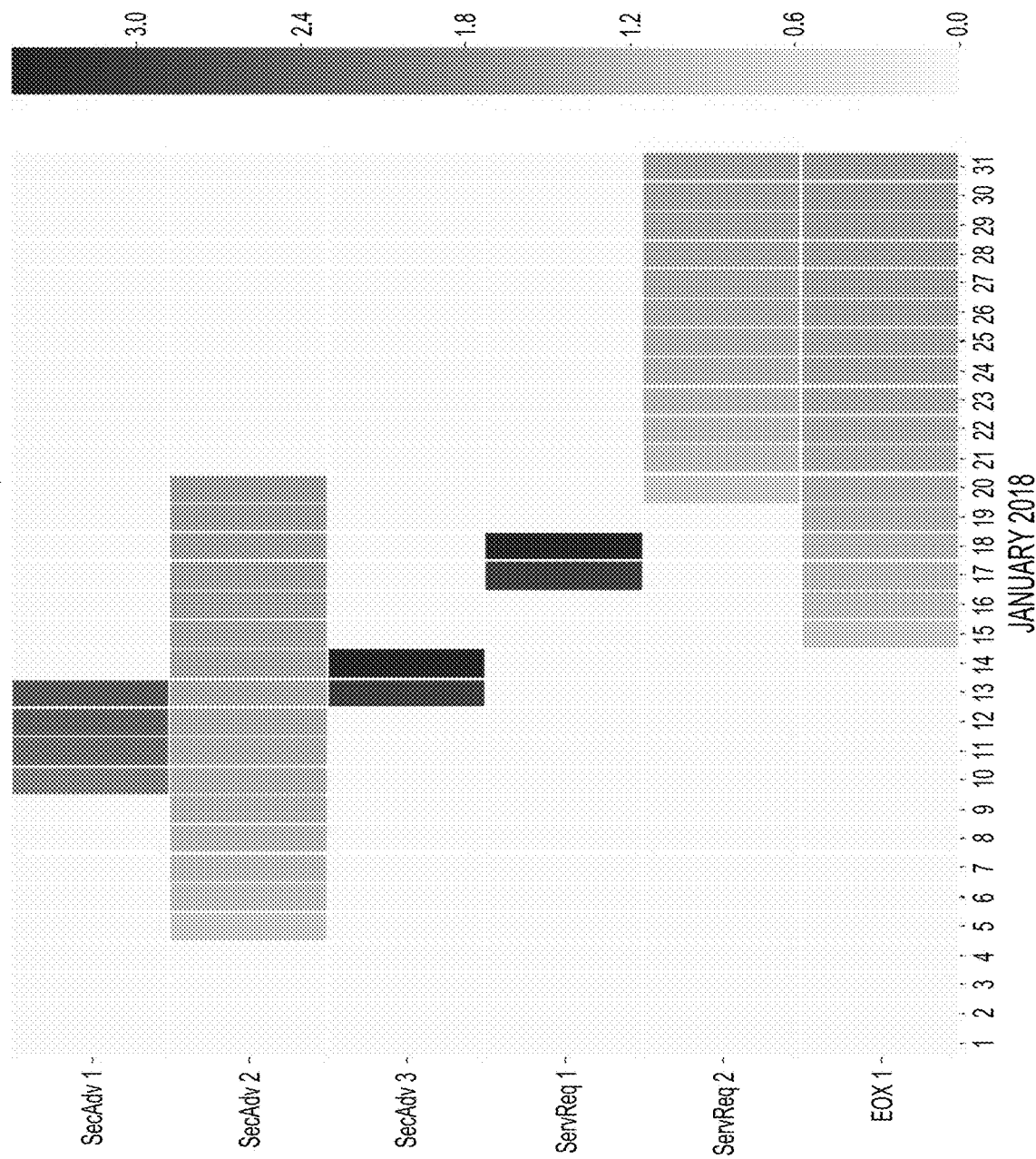
Figure 19:
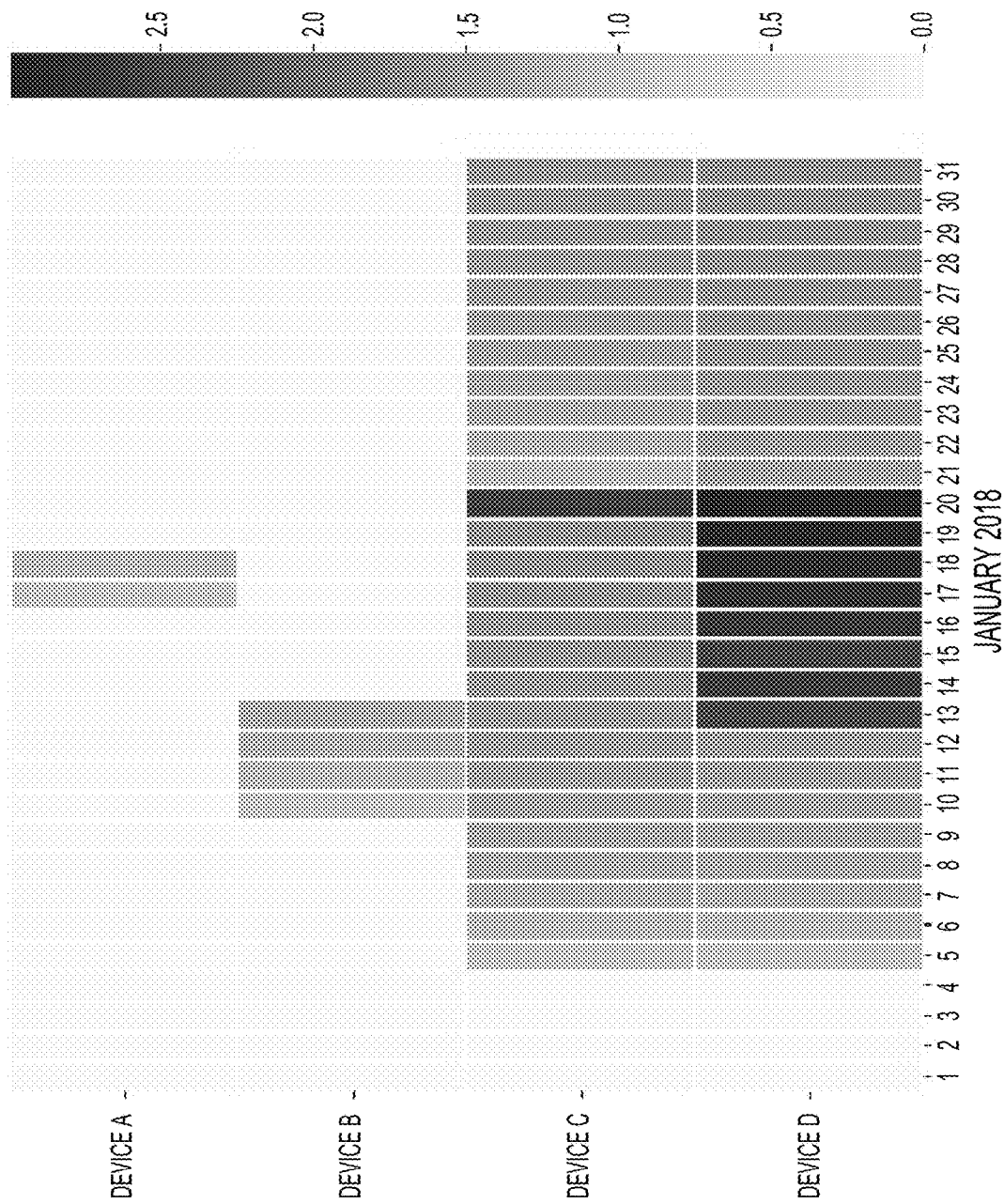
Figure 20:
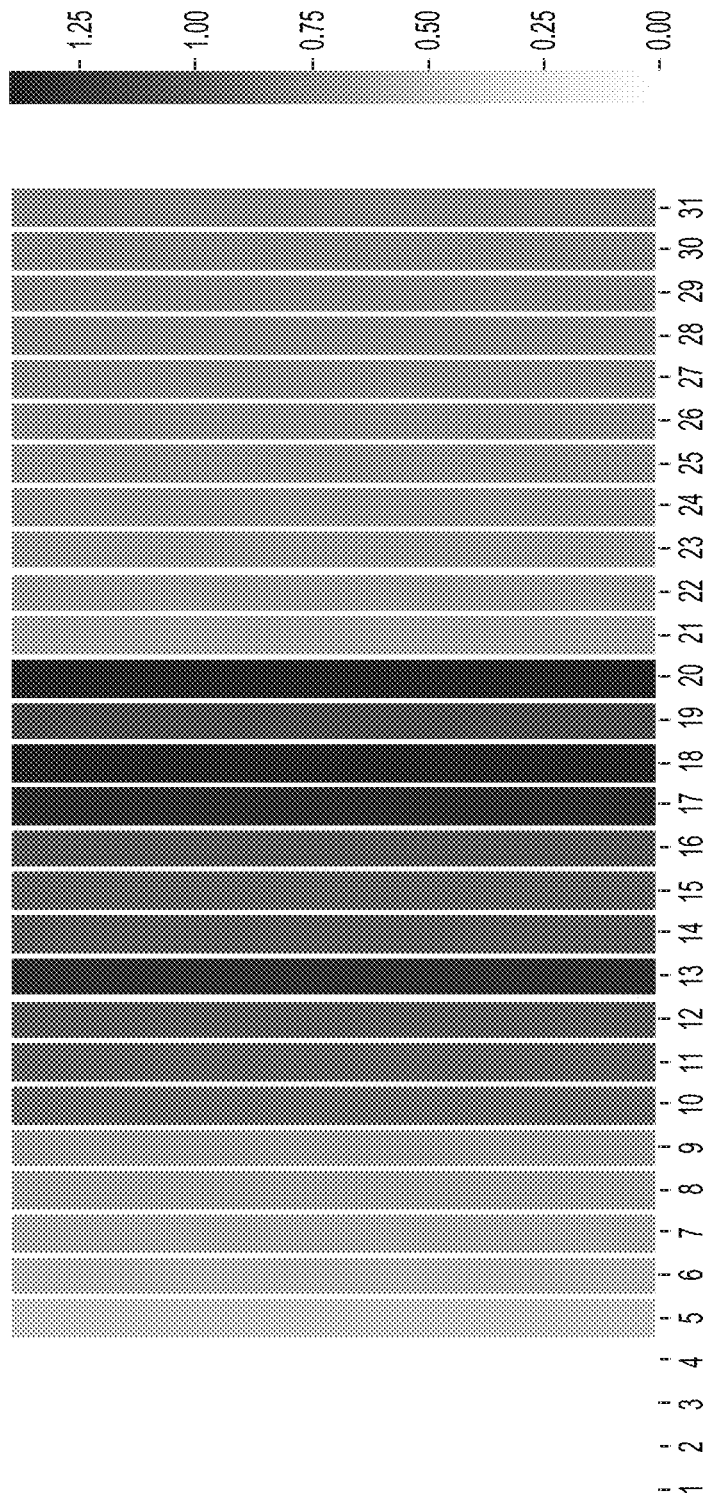

FIGS. 17-20 graphically depict the data and results of matrix calculations for an example month of data for the nodes A, B, C, and D in accordance with an example embodiment. As can be seen in FIG. 20, the network reaches a maximum disruption score of 1.4 on Jan. 18, 2018 and has an average disruption score of 0.77 for the example month of January.

For this analysis, and for simplicity, operating system and software details were omitted, as was device centrality. The matrix structures (FIGS. 14-16) are depicted in appropriately abridged form. A further description is provided as follows.

Assume logic NDI generation logic 150 receives:
Specified time frame;
List of network devices (FIG. 3, also FIGS. 4-5 if SW and OS as considered as well as HW);
Connectivity matrix (shown in FIG. 10) or vector of centrality designation weights; and List of disruption events impacting the network over the specified time frame (this is represented in FIGS. 7-9, wherein each figure represents one type of disruption event).

Logic 150 then
1. Divvies up disruption events by device—assigns indices of disruption events to appropriate lists (per device, one list for each type of disruption measure) (FIG. 10);
2. Creates a disruption event activity matrix for each device (this is all zeros and ones) (each disruption event has its own row, each column is a day in the considered time frame) (FIG. 17);
  i. Scales the disruption event activity matrix by the incident weight;
  ii. Scales the disruption event activity matrix according to time scaling protocol ((i) and (ii) together are represented in FIG. 18);
  iii. Sums along all columns to obtain device disruption activity vector;
3. Once performed for each device, concatenates the disruption activity vectors according to device ID order (FIG. 19);
4. Takes outer product with centrality measure vector (in column form), i.e. multiply each row by the corresponding device centrality weight. (this is a variation of FIG. 19).

The result is a matrix of (num devices) rows by (num days) columns.

This resulting matrix is a central component of the disruption index report and is represented in FIG. 19. If logic 150 sums along columns, that provides total network disruption per day (rather than the device by device breakdown). In doing so it may be advisable to perform a normalization of sorts by dividing each entry by the total number of devices to obtain a daily disruption index that is independent of scale (intuitively, it should not matter how many devices are in a network—more devices need not equate to more disruption). This is represented in FIG. 20. Intermediate breakdowns by device type (or similar) are a natural extension.

Figure 21:
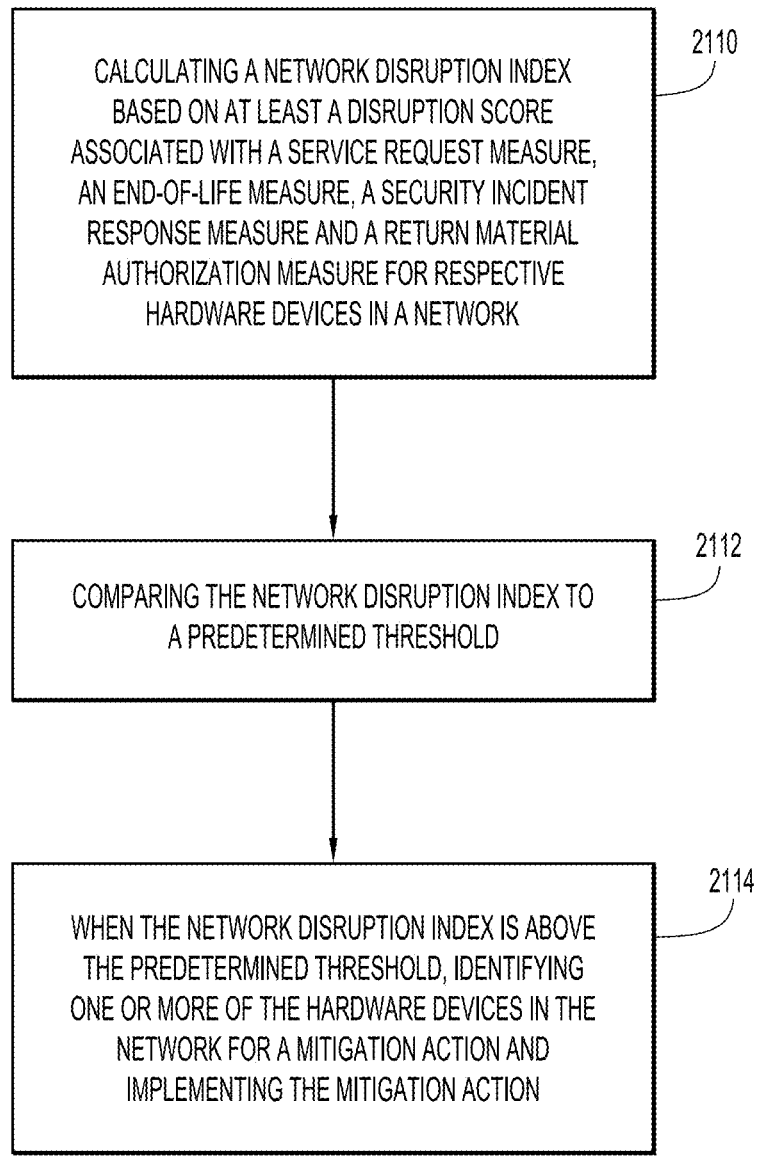
FIG. 21 is a flow diagram depicting a series of operations for calculate a network disruption index and using the same to manage a network or component thereof.

FIG. 21 is a flow diagram depicting a series of operations for calculate a network disruption index and using the same to manage a network or component (e.g., hardware device) thereof. At 2110, an operation calculates a network disruption index based on at least a disruption score associated with a service request measure, an end-of-life measure, a security incident response measure and a return material authorization measure for respective hardware devices in a network. At 2112, an operation compares the network disruption index to a predetermined threshold, and at 2114, when the network disruption index is above the predetermined threshold, an operation identifies one or more of the hardware devices in the network for a mitigation action and implements the mitigation action. As a result, the likelihood of a network disruption may be reduced.

Thus, described herein is a system and apparatus that measures the network disruption/instability via a Network Disruption Index (NDI) with an in-depth breakdown of disruption by network components and monitoring of trends over time. Hence, the system helps users identify platforms/devices that potentially have more problems than other users in their class (e.g., comparing Bank XYZ's network with the networks of other banks of the same size). The system also helps users identifying the problem scope, i.e., why network XYZ has more problems than other users (e.g., has more PSIRTS on platform x than the other users, services configured in XYZ network vs. services configured by other customers). Further, the system helps users identify a solution, e.g., update a software image, or replace a selected platform (device).

As a practical example, if a user currently uses Device A.1 in a network and is noticing a high contribution from that device to network disruption, then that might indicate that perhaps it is time to upgrade to Device A.2, or purchase some Device B, instead, to prevent further disruption. However, as a result of the granularity of the measures employed in the embodiments described herein, the disruption score for that device provides a breakdown into what is causing the device disruption. Thus, it may be that a software upgrade is indicated, rather than a hardware replacement.

In an embodiment, the index itself may be displayed to a user as an interactive dashboard including:

1. A single numerical score, useful for benchmarking and monitoring trends over time;

2. An interactive breakdown of the network providing details into factors contributing to disruption, e.g. individual or types of devices with recurring impactful events, slow resolution of Service Requests, etc.

3. Identification of top contributing factors into services-level network disruption 4. Visualization of network topology in concert with device disruption scores, enabling identification of problem areas geographically (helpful for very large networks). Based on the information provided through the dashboard, users can identify devices most in need of upgrades and areas of weakness in network management (Time to Resolution of SRs or Security Advisories, software not being kept up-to-date, etc.), and evaluate the impact that making device or service plan upgrades might have on their overall network robustness.

A sudden change in the NDI, particularly a drop in the score, indicates that something has occurred within a given network, and an administrator should investigate details provided by the dashboard to determine what has changed and what actions can be taken to prevent or remedy network disruption. The index is based on very specific parameters that track what has changed over time.

Figure 22:
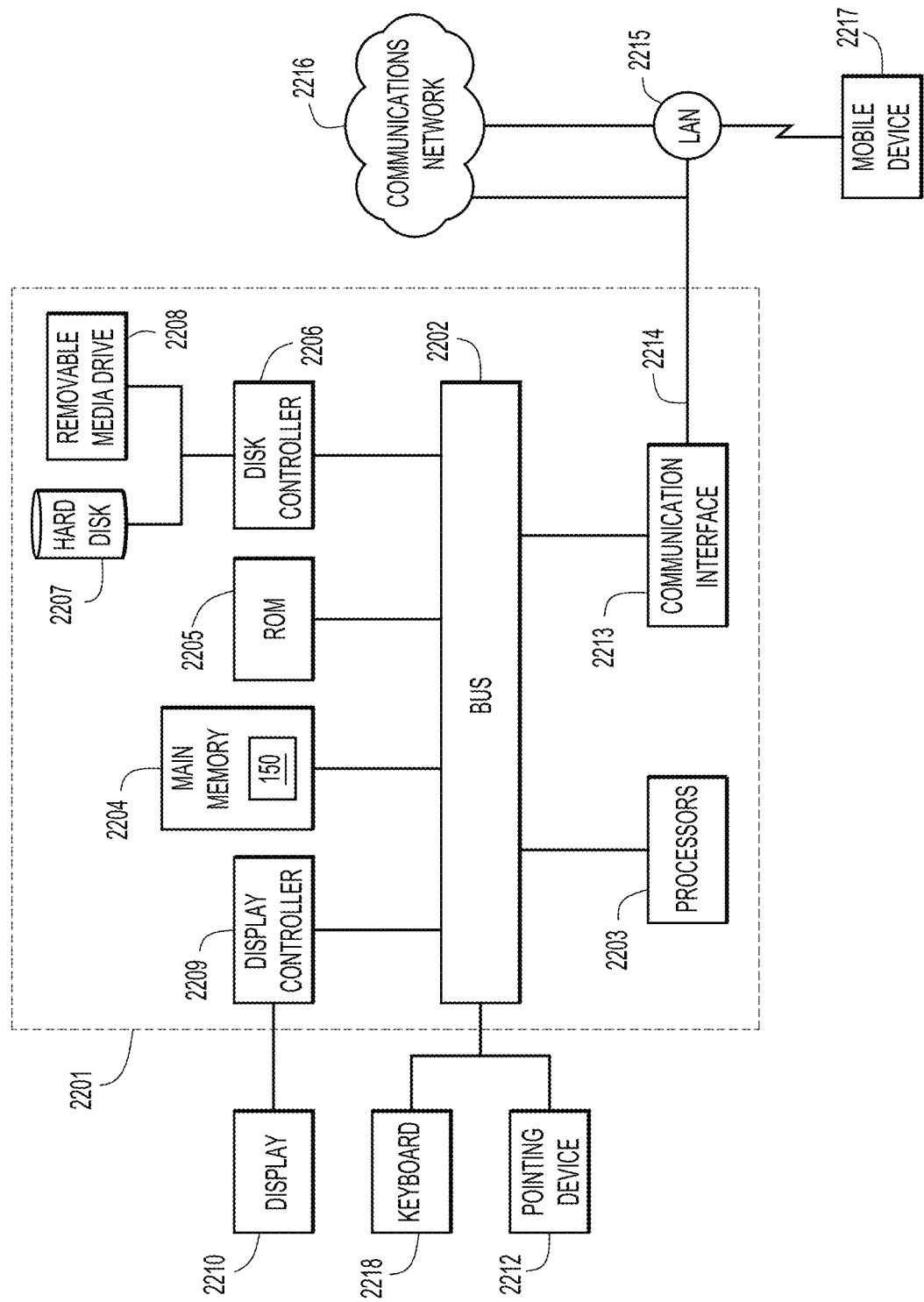
FIG. 22 depicts a device (e.g., a server device) on which the several described embodiments may be implemented.

FIG. 22 depicts a device (e.g., a server device) on which the several described embodiments may be implemented.

The device, e.g., server 140, may be implemented on or as a computer system 2201. The computer system 2201 may be programmed to implement a computer based device. The computer system 2201 includes a bus 2202 or other communication mechanism for communicating information, and a processor 2203 coupled with the bus 2202 for processing the information. While the figure shows a single block 2203 for a processor, it should be understood that the processor 2203 represents a plurality of processors or processing cores, each of which can perform separate processing. The computer system 2201 may also include a main memory 2204, such as a random access memory (RAM) or other dynamic storage device (e.g., dynamic RAM (DRAM), static RAM (SRAM), and synchronous DRAM (SD RAM)), coupled to the bus 2202 for storing information and instructions (e.g., NDI generation logic 150) to perform the operations described herein and to be executed by processor 2203. In addition, the main memory 2204 may be used for storing temporary variables or other intermediate information during the execution of instructions by the processor 2203.

The computer system 2201 may further include a read only memory (ROM) 2205 or other static storage device (e.g., programmable ROM (PROM), erasable PROM (EPROM), and electrically erasable PROM (EEPROM)) coupled to the bus 2202 for storing static information and instructions for the processor 2203.

The computer system 2201 may also include a disk controller 706 coupled to the bus 2202 to control one or more storage devices for storing information and instructions, such as a magnetic hard disk 2207, and a removable media drive 2208 (e.g., floppy disk drive, read-only compact disc drive, read/write compact disc drive, compact disc jukebox, tape drive, and removable magneto-optical drive). The storage devices may be added to the computer system 2201 using an appropriate device interface (e.g., small computer system interface (SCSI), integrated device electronics (IDE), enhanced-IDE (E-IDE), direct memory access (DMA), or ultra-DMA).

The computer system 2201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 2201 may also include a display controller 2209 coupled to the bus 2202 to control a display 2210, such as a cathode ray tube (CRT) or liquid crystal display (LCD), for displaying information to a computer user. The computer system 2201 may include input devices, such as a keyboard 2211 and a pointing device 2212, for interacting with a computer user and providing information to the processor 2203. The pointing device 2212, for example, may be a mouse, a trackball, or a pointing stick for communicating direction information and command selections to the processor 2203 and for controlling cursor movement on the display 2210. In addition, a printer may provide printed listings of data stored and/or generated by the computer system 2201.

The computer system 2201 performs a portion or all of the processing operations of the embodiments described herein in response to the processor 2203 executing one or more sequences of one or more instructions contained in a memory, such as the main memory 2204. Such instructions may be read into the main memory 2204 from another computer readable medium, such as a hard disk 2207 or a removable media drive 2208. One or more processors in a multi-processing arrangement may also be employed to execute the sequences of instructions contained in main memory 2204. In alternative embodiments, hard-wired circuitry may be used in place of or in combination with software instructions. Thus, embodiments are not limited to any specific combination of hardware circuitry and software.

As stated above, the computer system 2201 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system

2201, for driving a device or devices for implementing the described embodiments, and for enabling the computer system 2201 to interact with a human user. Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 2201 also includes a communication interface 2213 coupled to the bus 2202. The communication interface 2213 provides a two-way data communication coupling to a network link 2214 that is connected to, for example, a local area network (LAN) 2215, or to another communications network 2216. For example, the communication interface 2213 may be a wired or wireless network interface card or modem (e.g., with SIM card) configured to attach to any packet switched (wired or wireless) LAN or WWAN. As another example, the communication interface 2213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 2213 sends and receives electrical, electromagnetic or optical signals that carry digital data streams representing various types of information.

The network link 2214 typically provides data communication through one or more networks to other data devices. For example, the network link 2214 may provide a connection to another computer through a local area network 2215 (e.g., a LAN) or through equipment operated by a service provider, which provides communication services through a communications network 2216. The local network 2214 and the communications network 2216 use, for example, electrical, electromagnetic, or optical signals that carry digital data streams, and the associated physical layer (e.g., CAT 5 cable, coaxial cable, optical fiber, etc.). The signals through the various networks and the signals on the network link 2214 and through the communication interface 2213, which carry the digital data to and from the computer system 2201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. Thus, the digital data may be sent as unmodulated baseband data through a "wired" communication channel and/or sent within a predetermined frequency band, different than baseband, by modulating a carrier wave. The computer system 2201 can transmit and receive data, including program code, through the network(s) 2215 and 2216, the network link 2214 and the communication interface 2213. Moreover, the network link 2214 may provide a connection to a mobile device 2217 such as a personal digital assistant (PDA) laptop computer, cellular telephone, or modem and SIM card integrated with a given device.

In summary, in one form, a method is provided. The method includes calculating a network disruption index based on at least a disruption score associated with a service request measure, an end-of-life measure, a security incident response measure and a return material authorization measure for respective hardware devices in a network; comparing the network disruption index to a predetermined threshold; and when the network disruption index is above the predetermined threshold, identifying one or more of the hardware devices in the network for a mitigation action and implementing the mitigation action.

The method may further include weighting at least one of the service request measure, the end-of-life measure, the security incident response measure and the return material authorization measure. The weighting may include time-weighting at least one of the service request measure, the end-of-life measure, the security incident response measure and the return material authorization measure based on a length of time a given service request, a given end-of-life factor, a given security incident response or a given return material authorization has been present.

The time-weighting may be a function of log 10 of a number of days an incident associated with the at least one of the service request measure, the end-of-life measure, the security incident response measure or the return material authorization measure has been active. The weighting may include weighting at least one of the service request measure, the end-of-life measure, the security incident response measure and the return material authorization measure based on a centrality measure of a given hardware device in the network.

The method may also include calculating a disruption index for each of the respective hardware devices in the network, including calculating disruption functions separately for respective hardware devices.

The mitigation action may include at least one of upgrading an image of a given hardware device, replacing a given hardware device, updating a configuration file a given hardware device, or increasing memory or processing functionality of a given hardware device. The mitigation action may also include renewing a contract of a given hardware device, or software operating on the given hardware device.

In another form, a device may also be provided in accordance with an embodiment. The device may include an interface unit configured to enable network communications, a memory, and one or more processors coupled to the interface unit and the memory, and configured to: calculate a network disruption index based on at least a disruption score associated with a service request measure, an end-of-life measure, a security incident response measure and a return material authorization measure for respective hardware devices in a network; compare the network disruption index to a predetermined threshold; and when the network disruption index is above the predetermined threshold, identify one or more of the hardware devices in the network for a mitigation action and implement the mitigation action.

The one or more processors may further be configured to weight at least one of the service request measure, the end-of-life measure, the security incident response measure and the return material authorization measure.

The one or more processors may further be configured to weight by time-weighting at least one of the service request measure, the end-of-life measure, the security incident response measure and the return material authorization measure based on a length of time a given service request, a given end-of-life factor, a given security incident response or a given return material authorization has been present.

The time-weighting may be a function of log 10 of a number of days an incident associated with the at least one of the service request measure, the end-of-life measure, the security incident response measure or the return material authorization measure has been active.

The one or more processors may further be configured to weight by weighting at least one of the service request measure, the end-of-life measure, the security incident response measure and the return material authorization measure based on a centrality measure of a given hardware device in the network.

The one or more processors may further be configured to calculate a disruption index for each of the respective hardware devices in the network, and do so by calculating disruption functions separately for respective hardware devices.

In still another form, a non-transitory computer readable storage media is provided that is encoded with instructions that, when executed by a processor, cause the processor to perform operations including: calculate a network disruption index based on at least a disruption score associated with a service request measure, an end-of-life measure, a security incident response measure and a return material authorization measure for respective hardware devices in a network; compare the network disruption index to a predetermined threshold; and when the network disruption index is above the predetermined threshold, identify one or more of the hardware devices in the network for a mitigation action and implement the mitigation action.

The instructions may further include instructions that, when executed by a processor, cause the processor to weight at least one of the service request measure, the end-of-life measure, the security incident response measure and the return material authorization measure.

The instructions may further include instruction that, when executed by a processor, cause the processor to weight by time-weighting at least one of the service request measure, the end-of-life measure, the security incident response measure and the return material authorization measure based on a length of time a given service request, a given end-of-life factor, a given security incident response or a given return material authorization has been present.

The instructions may further include instruction that, when executed by a processor, cause the processor to weight by weighting at least one of the service request measure, the end-of-life measure, the security incident response measure and the return material authorization measure based on a centrality measure of a given hardware device in the network The above description is intended by way of example only. Various modifications and structural changes may be made therein without departing from the scope of the concepts described herein and within the scope and range of equivalents of the claims.

What is claimed is:

1. A method comprising:
   calculating a network disruption index based on at least a disruption score associated with a service request measure, an end-of-life measure, and a security incident response measure for respective hardware devices in a network;
   comparing the network disruption index to a predetermined threshold; and
   when the network disruption index is above the predetermined threshold, identifying one or more of the respective hardware devices in the network for a mitigation action and implementing the mitigation action.

2. The method of claim 1, further comprising weighting at least one of the service request measure, the end-of-life measure, and the security incident response measure.

3. The method of claim 2, wherein the weighting comprises time-weighting at least one of the service request measure, the end-of-life measure, and the security incident response measure based on a length of time a given service request, a given end-of-life factor, or a given security incident response has been present.

4. The method of claim 3, wherein the time-weighting is a function of log 10 of a number of days an incident associated with the at least one of the service request measure, the end-of-life measure, or the security incident response measure has been active.

5. The method of claim 2, wherein the weighting comprises weighting at least one of the service request measure, the end-of-life measure, and the security incident response measure based on a centrality measure of a given hardware device in the network.

6. The method of claim 2, further comprising calculating a disruption index for each of the respective hardware devices in the network.

7. The method of claim 1, wherein calculating a network disruption index comprises calculating disruption functions separately for the respective hardware devices.

8. The method of claim 1, wherein the mitigation action comprises at least one of upgrading an image of a given hardware device, replacing a given hardware device, updating a configuration file a given hardware device, or increasing memory or processing functionality of a given hardware device.

9. The method of claim 1, wherein the mitigation action comprises renewing a contract for a given hardware device, or for software operating on the given hardware device.

10. A device comprising:
    an interface unit configured to enable network communications;
    a memory;
    and one or more processors coupled to the interface unit and the memory, and configured to:
      calculate a network disruption index based on at least a disruption score associated with a service request measure, an end-of-life measure, and a security incident response measure for respective hardware devices in a network;
      compare the network disruption index to a predetermined threshold; and
      when the network disruption index is above the predetermined threshold, identify one or more of the respective hardware devices in the network for a mitigation action and implement the mitigation action.

11. The device of claim 10, wherein the one or more processors are further configured to weight at least one of the service request measure, the end-of-life measure, and the security incident response measure.

12. The device of claim 11, wherein the one or more processors are further configured to weight by time-weighting at least one of the service request measure, the end-of-life measure, and the security incident response measure based on a length of time a given service request, a given end-of-life factor, or a given security incident response has been present.

13. The device of claim 12, wherein the time-weighting is a function of log 10 of a number of days an incident associated with the at least one of the service request measure, the end-of-life measure, or the security incident response measure has been active.

14. The device of claim 11, wherein the one or more processors are further configured to weight by weighting at least one of the service request measure, the end-of-life measure, and the security incident response measure based on a centrality measure of a given hardware device in the network.

15. The device of claim 10, wherein the one or more processors are further configured to calculate a disruption index for each of the respective hardware devices in the network.

16. The device of claim 10, wherein the one or more processors are further configured to calculate the network disruption index by calculating disruption functions separately for the respective hardware devices.

17. A non-transitory computer readable storage media encoded with instructions that, when executed by a processor, cause the processor to:
 calculate a network disruption index based on at least a disruption score associated with a service request measure, an end-of-life measure, and a security incident response measure for respective hardware devices in a network;
 compare the network disruption index to a predetermined threshold; and
 when the network disruption index is above the predetermined threshold, identify one or more of the respective hardware devices in the network for a mitigation action and implement the mitigation action.

18. The non-transitory computer readable storage media of claim 17, further including instructions that, when executed by the processor, cause the processor to weight at least one of the service request measure, the end-of-life measure, and the security incident response measure.

19. The non-transitory computer readable storage media of claim 18, further including instructions that, when executed by the processor, cause the processor to weight by time-weighting at least one of the service request measure, the end-of-life measure, and the security incident response measure based on a length of time a given service request, a given end-of-life factor, or a given security incident response has been present.

20. The non-transitory computer readable storage media of claim 18, further including instructions that, when executed by the processor, cause the processor to weight by weighting at least one of the service request measure, the end-of-life measure, and the security incident response measure based on a centrality measure of a given hardware device in the network.

* * * * *